United States Patent
Flockhart et al.

(10) Patent No.: US 8,315,373 B1
(45) Date of Patent: Nov. 20, 2012

(54) ENHANCED POLLING METHOD AND SYSTEM

(75) Inventors: Andrew D. Flockhart, Thornton, CO (US); Eugene Mathews, Marco Island, FL (US)

(73) Assignee: Avaya Inc., Basking Ridge, NJ (US)

( * ) Notice: Subject to any disclaimer, the term of this patent is extended or adjusted under 35 U.S.C. 154(b) by 1258 days.

(21) Appl. No.: 12/049,357

(22) Filed: Mar. 16, 2008

(51) Int. Cl.
*H04M 3/00* (2006.01)
*H04M 5/00* (2006.01)

(52) U.S. Cl. ......... 379/266.06; 379/266.08; 379/265.01; 379/265.02

(58) Field of Classification Search ............. 379/266.06, 379/266.08, 265.01, 265.02
See application file for complete search history.

(56) References Cited

U.S. PATENT DOCUMENTS

| | | | |
|---|---|---|---|
| 5,740,238 A | 4/1998 | Flockhart et al. |
| 5,754,639 A | 5/1998 | Flockhart et al. |
| 6,360,186 B1 | 3/2002 | Durbin |
| 6,823,062 B2 | 11/2004 | Kepley |

*Primary Examiner* — Quynh Nguyen
(74) *Attorney, Agent, or Firm* — Sheridan Ross P.C.

(57) ABSTRACT

A method and system for dynamically determining a poll wherein at least a first parameter for each queue of one or more queues is maintained and a poll for each queue based upon an initial polling mode corresponding to each of the one or more queues is conducted. The polling mode comprises either a scheduled polling mode or an on-demand polling mode. Thereafter, at least a second parameter for each queue based on the poll is determined and an interval or a mode of a subsequent poll for each queue based on a comparison between the first parameter and the second parameter corresponding to each queue is scheduled. The subsequent poll is either (a) a different one of the scheduled poll and the on-demand poll, or (b) the scheduled poll having a different polling interval than the initial polling mode wherein the initial polling mode is also the scheduled poll.

12 Claims, 5 Drawing Sheets

| INTERVAL | TIME INTERVAL (SECONDS) | ADJUSTED EWT AT END OF INTERVAL | ACTUAL EWT IN POLL RESPONSE AT END OF INTERVAL | TIME DIFFERENTIAL | NEW INTERVAL TIMER |
|---|---|---|---|---|---|
| 1 | 20 | 25 | 27 | 2 | 21 |
| 2 | 21 | 31 | 28 | 3 | 22 |
| 3 | 22 | 28 | 24 | 4 | 23 |
| 15 | 34 | 39 | 46 | 7 | 35 |
| 16 | 35 | 43 | 32 | 11 | 30 |
| 17 | 30 | 41 | 36 | 5 | 31 |
| 18 | 31 | 43 | 38 | 5 | 32 |

FIG. 5

ENHANCED POLLING METHOD AND SYSTEM

FIELD OF THE INVENTION

The present method and system relates to polling techniques. More particularly, the present method and system relates to enhanced status polling techniques for load balancing inbound calls across a network of systems.

BACKGROUND

Call centers employ agents who attend to incoming queries from customers. In order to timely service a customer, it is critical that the call traffic be handled appropriately. Given that most of these organizations are service-centric, it is important that they promptly attend to their customers.

Call centers may have one or more agents in various locations, and one or more Automatic Call Distributors ("ACDs") in each of those locations to distribute incoming calls to agents. Often times, the number of calls exceed the call handling capacity of the call center. In such situations, many calls are kept on hold or in a queue so that they may be attended to as soon as suitable agents become available. However, if a call is assigned to a particular queue with large number of waiting calls, calls of an urgent nature may not get proper priority or the caller might just terminate the call out of frustration due to the lengthy wait time. This may lead to a loss of sales or customers or both.

There are different polling techniques to obtain queue status information to load balance inbound calls across a network of ACD systems. In accordance with one technique, namely "on-demand" polling, polling occurs whenever an inbound call needs to be routed to the best destination. In accordance with another technique, namely "scheduled" polling, polling occurs at periodic time intervals regardless of the arrival of incoming calls. In the scheduled polling technique, the status information is stored and used to direct calls to the best destination when a route request is received.

The status information includes information about the conditions within a queue or queues at the time the status poll was received. This information is then used to route calls to the best destination within the network. More specifically, the status information includes expected wait time (EWT) and weighted advance time (WAT). The EWT is the expected wait time for a new call, if it were to be placed in the call queue at this moment in time. WAT is the average time it takes a call to advance one position in that queue. WAT is useful in determining the consequences of queuing a new call to a queue or servicing a call from the queue.

In the scheduled polling technique, the status information is adjusted based on events and on elapsed time, in order to keep the stored data as accurate as possible between scheduled polls. For example, when a call is routed to the best destination, the EWT for that destination is increased by WAT to account for the additional call. Also every WAT seconds, EWT is decreased by WAT, to reflect the fact that calls are being serviced from queue between scheduled polls. However, in scheduled polling, polls are unnecessarily taken even when no call has arrived for a considerable period of time.

On-demand polling provides the most accurate routing, since calls are routed using the most up-to-date status information. However, on-demand polling is not practical in all-scenarios. First, on-demand polling is not fast enough when very rapid responses to route requests are required. Second on-demand polling is not efficient, because an excessive number of polls are issued when call volumes are very high.

Thus, an efficient and effective polling technique is required that provides accurate updated queue status information with an efficient utilization of resources.

SUMMARY

A method is directed towards dynamically determining a time for and/or a mode (type) of a poll. In one embodiment, at least a first parameter for each queue of one or more queues is maintained and a poll for each queue based upon an initial polling mode corresponding to each of the one or more queues is conducted. The polling mode comprises one of an enhanced scheduled polling mode or an on-demand polling mode. Thereafter, at least a second parameter for each queue based on the poll is determined and a subsequent poll for each queue based on a comparison between the first parameter and the second parameter corresponding to each queue is scheduled. The subsequent poll is either (a) a different one of the scheduled poll and the on-demand poll, or (b) the scheduled poll having a different polling interval than the initial polling mode wherein the initial polling mode is also the scheduled poll.

In another embodiment, a system comprises a memory maintaining at least a first parameter for each of the one or more queues and a communications device that conducts a poll for each queue based upon an initial polling mode corresponding to each of the one or more queues. The initial polling mode comprises one of a scheduled poll and an on-demand poll. The system further comprises a determinator that determines at least a second parameter for each queue based on the poll and a scheduler that schedules the subsequent poll for each queue based on a comparison between the first parameter and the second parameter corresponding to each queue.

BRIEF DESCRIPTION OF DRAWING

The above and other aspects of the method and system will be apparent upon consideration of the following detailed description taken in conjunction with the accompanying drawing, in which like reference characters refer to like parts throughout, and in which:

FIG. 5 is an exemplary illustration of the embodiment described in FIG. 4.

DETAILED DESCRIPTION

Figure 1:
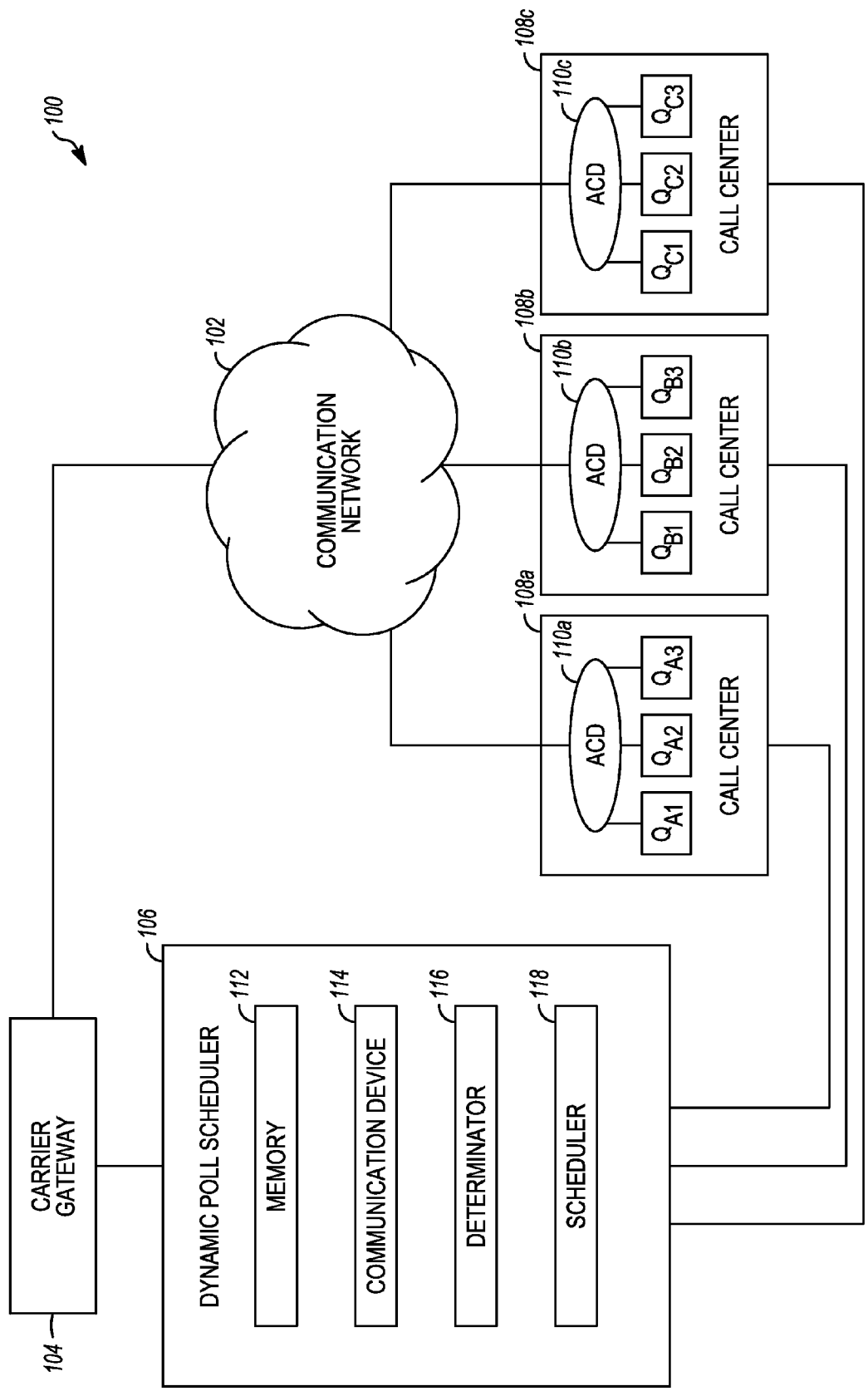
FIG. 1 is a block diagram of a telecommunication system 100, according to an exemplary embodiment.

FIG. 1 is a block diagram of a telecommunication system 100 according to an exemplary embodiment. The telecommunication system 100 includes a communication network 102 coupled to a carrier gateway 104. The communication network 102, without limitation, includes circuit-switched networks, for example, a public circuit-switched telephone network (PSTN), and packet-switched networks, for example, an Internet-protocol based network. The carrier gateway 104 may be coupled to the communication network 102 via a set of signaling protocols. The signaling protocols may include, but are not limited to, a Signaling System 7 network (SS7) protocols, and the like. The telecommunication system 100 further includes a dynamic poll scheduler 106 for managing multiple calls at various call centers (108a, 108b, and 108c). Alternately, each call center may be coupled to a dynamic poll scheduler that manages multiple incoming calls directed to one or more automatic call distributors. The call centers 108, without limitation, may include central offices or private branch exchanges (PBXs) used for the purpose of interacting with a large volume of customers. The call centers 108 may be service-centric companies providing support to other companies. Each call center 108 accommodates a group of call agents at different agent position terminals to communicate with the customers. Each of the call centers 108a, 108b, and 108c comprises an Automatic Call Distributor (ACD) switch (110a, 110b, and 110c, respectively) which handles one or more call queues ($Q_{A1}$, $Q_{A2}$, and the like). Each ACD switch, without limitation, is a device that distributes incoming calls to the call agents of the respective call center 108. The ACD switch connects the agent position terminals to the communication network 102. The agent position terminals of each of the call centers 108 may be divided into one or more splits or skills each serving one or more call queues. The respective ACD switch defines a call queue for each of the splits or skills. In various embodiments, the call queue is a queue of waiting calls routed to one of the splits or skills for attention. One or more of the call queues may comprise a plurality of priority queues, each for holding waiting calls of a different priority. The dynamic poll scheduler 106 may select the best call queue to route an incoming call to, while taking into consideration the priority queues.

The dynamic poll scheduler 106 is a computing device suitable for implementing various embodiments. The dynamic poll scheduler 106 may be, for example, without limitation, personal computers, servers, mainframes, a network call router and the like. The dynamic poll scheduler 106 includes a memory 112, a communications device 114, a determinator 116, and a scheduler 118. The memory 112 may include a dynamic or static random access memory, magnetic or optical data storage disks, or magnetic data storage tapes, and the like. Other processing and memory means, including various computer readable media, may be used for storing and executing program instructions. The memory 112 maintains at least one first parameter of each of the plurality of queues. The first parameter includes without limitation, an Expected Wait Time (EWT) entry, an Average Advance Time (AAT) entry, a Weighted Average Time (WAT) entry, a queue polling interval, a first threshold, a second threshold, a third threshold and the like. The memory 112 may maintain the information of the queues in a queue table containing a plurality of queue entries, with at least one queue entry for each of the call queues. Each queue entry corresponds to at least one parameter, such as, but without limitation, a call center ID, a call queue ID, a EWT parameter, an AAT parameter, a WAT parameter, and the like. The EWT of a call queue is an estimate of how long a last call enqueued in a call queue can expect to wait before being assigned to a call agent for servicing. The WAT is an exponential moving average of the AATs of the calls that have previously been serviced from the call queue. The AAT is an average time that an incoming call takes to advance by one position in a call queue. Every time an incoming call is serviced from the queue, the AAT of the incoming call may be used to make a small adjustment to the WAT of the queue.

Each call queue operates using a polling mode which may change at various points in time due to for example, incoming call traffic or availability of splits or skills. Further, at a given time, different queues may operate in different modes, for example, some queues may use scheduled polling while others may use on-demand polling.

The dynamic poll scheduler 106 may comprise a communication device 114 that conducts a poll on each call queue based on the queues' initial polling mode to obtain the status of the call queue whenever an event corresponding to the initial polling mode of the call queue takes place. These events may include, without limitation, expiration of a polling interval or arrival of a call. For call queues using on-demand polling, communication device 114 may poll the queues on the arrival of the call, while it may conduct polls for call queues using scheduled polling on the expiry of the polling intervals. The queue polling interval as well as the queue polling mode may be stored in the memory 112. In an embodiment, a separate poll is conducted for each of the call queues. The status of the call queue includes at least one updated parameter for the call queue for example, the number of waiting calls, time spent by each call before being serviced. The communication device 114 may store the updated parameters in the queue table.

The dynamic poll scheduler 106 may comprise a determinator 116 that determines at least a second parameter for each call queue using the updated parameters obtained during the conducted poll of the call queue. The determinator 116 determines the second parameter for example, WAT and actual EWT. Thereafter, the dynamic poll scheduler 106 may use a scheduler 118 that schedules a subsequent poll for each queue using the first parameter and the second parameter.

The scheduler 118 may adjust one of the first parameters of at least one call queue, for example, the polling interval or the initial polling mode, to schedule a subsequent poll. In an exemplary embodiment, the scheduler 118 adjusts the EWT of the call queue at various instances including, without limitation, upon each routing of an incoming call to the call queue, upon expiration of a WAT interval, and the like. Upon expiration of a WAT interval, the scheduler 118 may decrement the EWT entry by the value of the WAT entry. Upon each addition of an incoming call to the call queue, the scheduler 118 may increment the EWT entry by the WAT entry. The adjusted value of the EWT is stored as the EWT entry and is hereinafter referred to as an adjusted EWT.

The teachings of the dynamic poll scheduler 106 may be implemented as a combination of hardware and software. Moreover, the software is preferably implemented as an application program tangibly embodied on a program storage unit or computer readable medium. The application program may be uploaded to, and executed by, a machine comprising any suitable architecture.

Various method embodiments will now be described in detail using diagrams 2-4.

Figure 2:
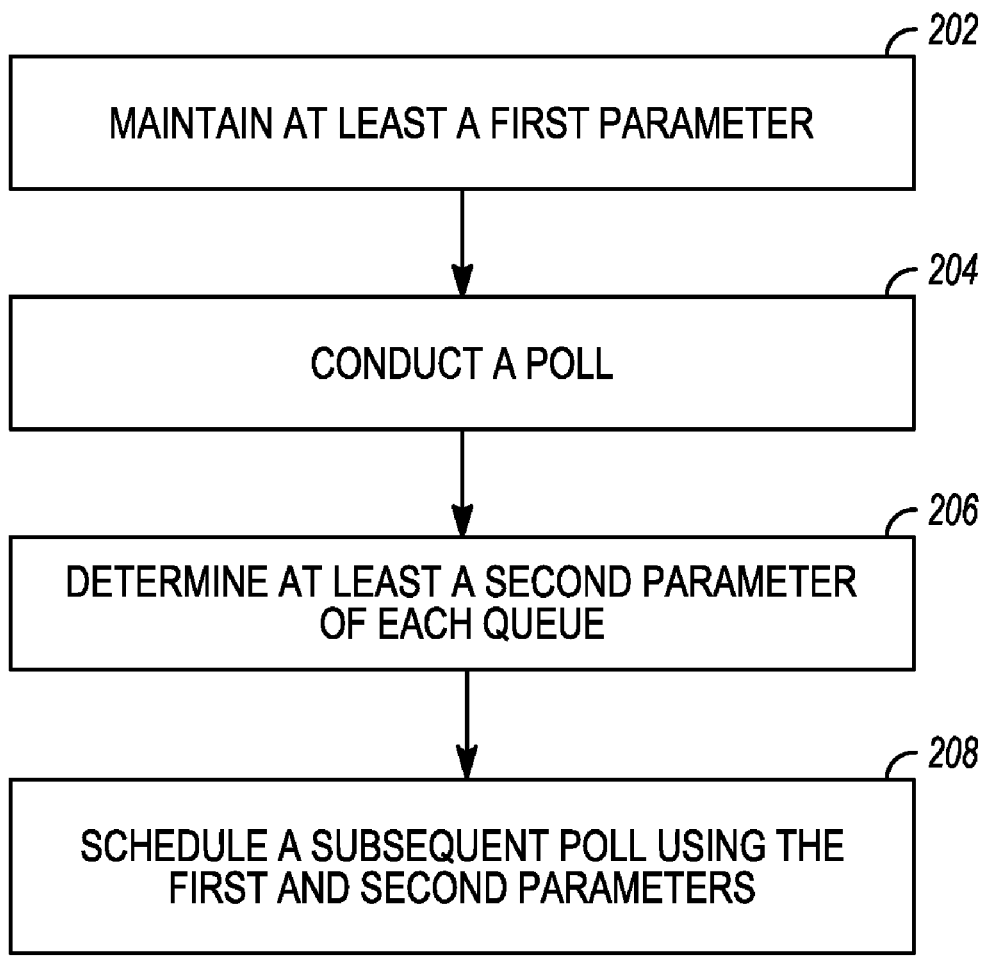
FIG. 2 depicts a flowchart illustrating a method for efficient polling of calls in accordance with an embodiment.

FIG. 2 depicts a flowchart illustrating a method for efficient polling of calls in accordance with an embodiment. At step 202, memory 112 maintains at least one first parameter for each of the plurality of queues. The first parameter comprises at least one of, without limitation, a WAT parameter, a EWT, a first threshold, a second threshold, a third threshold, a queue polling mode, and a queue polling interval. The first threshold, the second threshold and the third threshold are predefined parameters. The polling modes may be, without limitation, a scheduled poll or an on-demand poll. Each queue has a corresponding queue polling mode. The dynamic poll scheduler 106 conducts a poll on each queue based upon the initial queue polling mode, at step 204. For the queues operating using scheduled poll mode, the dynamic poll scheduler 106 conducts the polls on the expiry of their queue polling interval, while for the queues operating using on-demand polling, the dynamic poll scheduler 106 conducts polling on arrival of a call.

At step 206, the dynamic poll scheduler 106 determines at least a second parameter of each queue on which a poll is conducted. The dynamic poll scheduler 106 may determine a new value of the EWT or the WAT associated with the queue. For each queue, based on a comparison (described in FIGS. 3 and 4 in detail) between the queue's first parameter and the second parameter, the dynamic poll scheduler 106 schedules a subsequent poll, at step 208. While scheduling, the dynamic poll scheduler 106 may change the queue polling mode or the queue polling interval, as is further described in detail in FIGS. 3 and 4, respectively.

Figure 3:
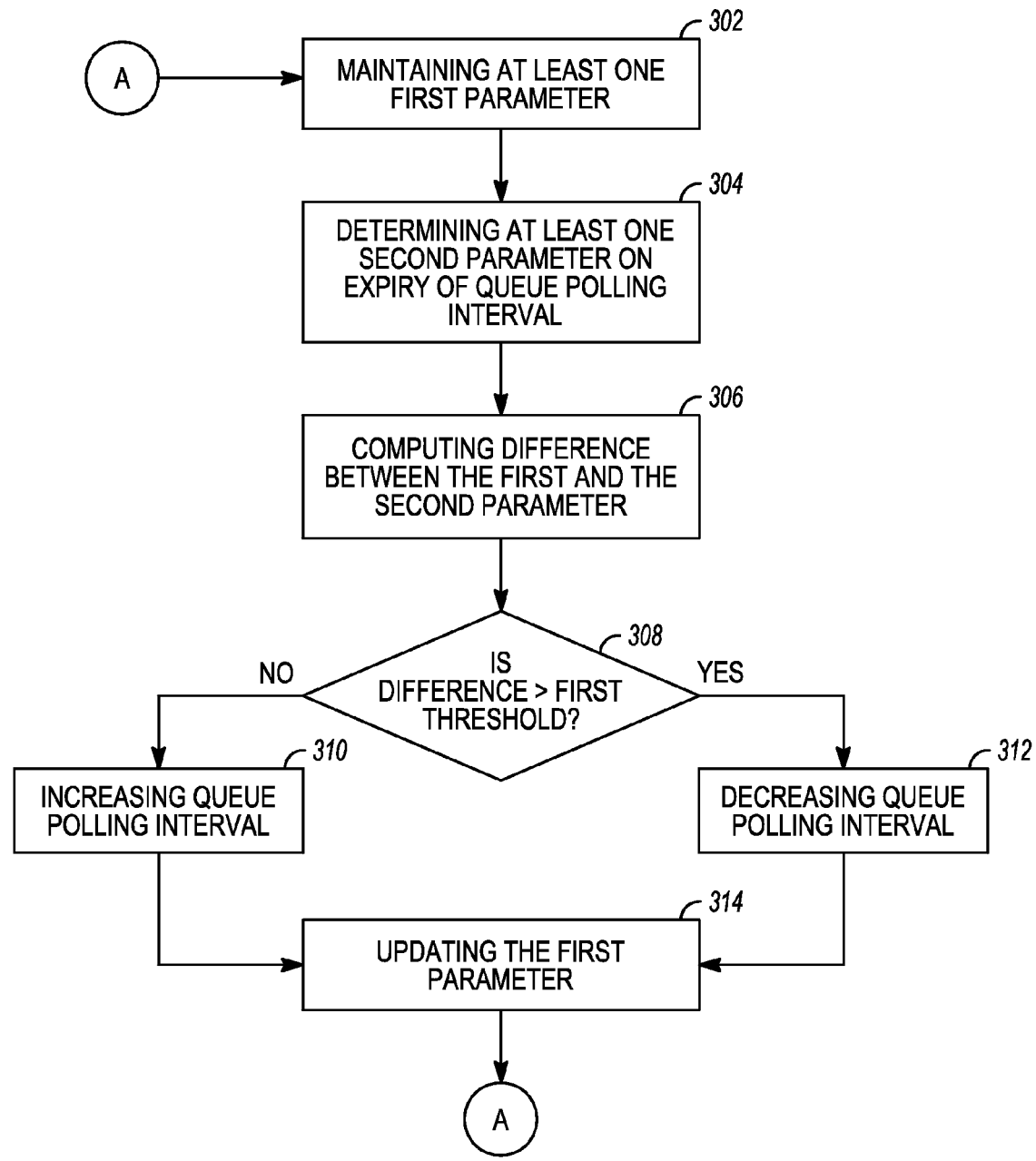
FIG. 3 is a detailed flow diagram representation of the method in accordance with an embodiment.

FIG. 3 is a detailed flow diagram representation of a method for determining a poll in accordance with an embodiment. The dynamic poll scheduler 106 maintains at least one first parameter, for example, adjusted EWT, in the memory 112 for each queue at step 302. Other examples of first parameter for a queue include weighted advance time, a first threshold, and a queue polling interval. The dynamic poll scheduler 106 determines at least one second parameter, namely, the actual EWT, in step 304 for each queue on the expiry of its queue polling interval. The actual EWT is the actual wait time of a call queue received from the poll. The dynamic poll scheduler may determine the second parameter by conducting a poll on the queue. In step 306, the dynamic poll scheduler 106 computes the difference between the second parameter, namely the actual EWT, and the first parameter, namely, the adjusted EWT of the queue. If the difference is less than a first threshold (step 308), the dynamic poll scheduler 106 increments the value of the polling interval of the queue, at step 310. For example, the dynamic poll scheduler 106 increments the polling interval by a predefined increment value, for example, 1 second. Thus, the next poll for the queue will be conducted using the incremented polling interval as opposed to the previous polling interval value.

If the difference is above the first threshold (step 308), the dynamic poll scheduler 106 decrements the polling interval by a predefined decrement value, for example, 5 seconds, in step 312. Thus, the next poll is advanced and is conducted using the decremented polling interval. In an embodiment, the unit of decrementing or incrementing the polling interval can be kept fixed or varied depending on the required performance of the system. In step 314, the dynamic poll scheduler 106 updates the first parameters (WAT and EWT) by replacing the first parameters with the corresponding second parameters. Thereafter, the method returns to step 302.

Thus, as the process of FIG. 3 is repeated, the method constantly adjusts the polling intervals to provide the optimum combination of efficiency and effectiveness of polls. Please note that this embodiment is described with reference to one queue of the ACD. In case ACD manages several call queues, this method may be performed for all the queues individually.

Figure 4:
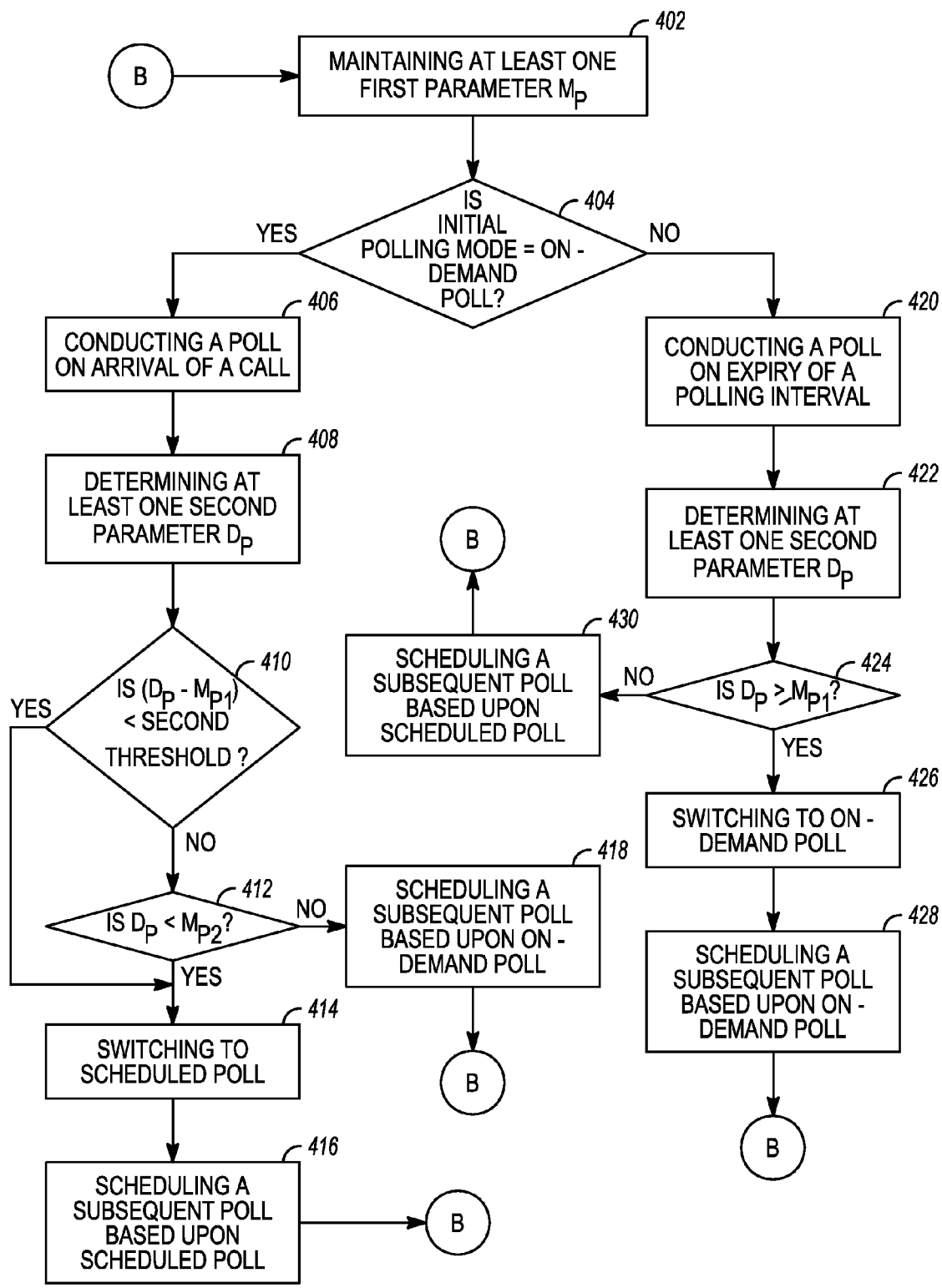
FIG. 4 is another detailed flow diagram representation of the method in accordance with another embodiment.

FIG. 4 is a detailed flow diagram representation of a method for determining a poll in accordance with another embodiment. In step 402, the dynamic poll scheduler 106 maintains at least one first parameter, for example, a WAT parameter, an EWT parameter, a first threshold, a second threshold, a third threshold, a queue polling mode, or a queue polling interval for a queue. The at least one first parameter is, hereinafter, interchangeably referred to as Mp. The dynamic poll scheduler 106 checks for the queue polling mode (initial polling mode) of a queue in step 404. If the dynamic poll scheduler 106 determines that the initial polling mode is an on-demand polling mode, the dynamic poll scheduler 106 conducts the poll for that queue, at step 406, on arrival of a call. The dynamic poll scheduler 106 determines at least one second parameter, such as weighted average time (WAT), from the poll data of the queue in step 408. The at least one second parameter is, hereinafter, interchangeably referred to as Dp.

At step 410, the dynamic poll scheduler 106 compares whether the difference between the Dp and one parameter ($M_{p1}$) of the Mp is less than a second threshold. In an embodiment, the Dp is WAT, while the $M_{p1}$ is the queue polling interval. If the difference between the Dp and the $M_{p1}$ is not less than the second threshold, the dynamic poll scheduler 106 checks whether the second parameter (Dp), namely, WAT, is less than another parameter ($M_{p2}$) of the Mp, namely, the third threshold (step 412). Though the steps 410 and 412 are carried out in that order in an embodiment described above, a person skilled in the art will appreciate that steps 410 and 412 may be carried out independently or one after the other without any preference to the order of execution of the two.

If either of the conditions checked at steps 410 or 412 is true, the dynamic poll scheduler 106, in step 414, switches the polling mode of the queue to scheduled polling mode. Thereafter, the dynamic poll scheduler 106 schedules a subsequent poll based on the scheduled polling mode (step 416). Else, if both the conditions (steps 410 and 412) are false, the dynamic poll scheduler 106 maintains the initial polling mode of the queue (that is, on-demand polling mode) and schedules the subsequent poll based on the on-demand polling mode (step 418).

However, if the dynamic poll scheduler 106, at step 404, determines that the initial polling mode of the queue is not on-demand rather a scheduled polling mode, the dynamic poll scheduler 106 conducts the poll for the queue upon expiry of the queue polling interval at step 420. Thereafter, at step 422, the dynamic poll scheduler 106 determines the second parameters for the queue.

The dynamic poll scheduler 106 checks whether the Dp, namely, WAT, is greater than or equal to the $M_{p1}$, namely, a queue polling interval in step 424. If the dynamic poll scheduler 106 determines that WAT is greater than or equal to the queue polling interval, the dynamic poll scheduler 106 switches the polling mode of the queue to on-demand poll mode, at step 426. Thereafter, the dynamic poll scheduler 106 schedules the subsequent poll based on the on-demand poll mode (step 428). Else, if at step 424, it is found WAT is less than the polling interval, the dynamic poll scheduler 106 maintains the initial polling mode of the queue (that is, scheduled polling mode) and schedules the subsequent poll based on the scheduled polling mode (step 430).

Also, the dynamic poll scheduler 106 replaces the first parameters with the corresponding value of the second parameters after step 416 or 428 so that for next queue poll, updated values are used. Thereafter, the method returns to step 402. Similarly, the dynamic poll scheduler 106 replaces the first parameters with the corresponding value of the second parameters after step 418 or 430 and returns to step 402.

Thus, as explained above, the dynamic poll scheduler 106 may switch the polling mode of a queue from scheduled to on-demand and vice-versa to balance load across the ACD networks as the process of FIG. 4 is repeated. Thus, at a given point in time, a queue may operate in on-demand polling mode while at another time the queue may operate in scheduled polling mode to maintain efficiency and effectiveness. Also, at other point in time, all queues may operate either in the on-demand polling mode or the scheduled polling mode. At yet another point in time, an equal number of queues may operate in either mode.

FIG. 5 is an exemplary tabular representation of the embodiment described in FIG. 3. In this example, we consider that a call queue operates in scheduled poll mode. As an example, we assume following initial values:
Initial polling interval (D1)=20 seconds
Acceptable time differential between adjusted EWT and actual EWT at the end of an interval or first threshold (T1)=10 seconds The table has six columns, namely, serial number, interval timer, adjusted EWT at the end of a polling interval, actual EWT in poll response at the end of the interval, time differential, and new timer interval. The interval timer refers to the polling interval before a poll is conducted. Time differential refers to the difference between the adjusted EWT and the actual EWT at the end of an interval. New timer interval refers to the adjusted polling interval. The value of 'first threshold' is fixed. However, this value can be varied to suit needs on various occasions. For example, when the call traffic is high, the value of T1 could be lower as compared to when the call traffic is low.

The system starts with the following parameters
Interval timer (polling interval)=20 seconds Dynamic poll scheduler schedules a poll on the expiry of 20 seconds. It determines the actual EWT to be 27 seconds. At the time of the poll, the Adjusted EWT is 25 seconds. Thereafter, it computes the time differential to be 2 seconds. Since the time differential is less than T1, it increments the value of the polling interval by 1 sec to obtain new interval timer value as 21 seconds. It uses the new interval timer value to conduct the subsequent poll. This process is repeated on the expiry of each polling interval.

To illustrate the decrementing aspect, during the sixteenth poll, the value of the time differential is found to be greater than the first threshold. In this case, the dynamic poll scheduler 106 decrements the interval timer by 5 seconds (for this example) to obtain the new interval timer as 30 seconds. Thus, after every poll, the value of the new interval timer may be incremented or decremented or may remain same.

The invention can be practiced using various embodiments described above individually or in combination. Of course, various changes and modifications to the illustrative embodiments described above will be apparent to those skilled in the art. For example, use of the invention is not limited to communications queues in customer contact centers, but may be used with any plurality of work queues for work items of any kind. These changes and modifications can be made without departing from the spirit and the scope of the invention and without diminishing its attendant advantages. It is therefore intended that such changes and modifications be covered by the following claims.

What is claimed is:

1. A method of dynamically determining a poll subsequent to an event, wherein the event comprises an arrival of a call or expiry of a polling interval, the method comprising:
   a) maintaining at least a first parameter for each of one or more queues;
   b) conducting a poll for each queue based upon an initial polling mode corresponding to each of the one or more queues, wherein the initial polling mode comprises one of a scheduled poll and an on-demand poll;
   c) determining at least a second parameter for each queue based on the poll;
   d) scheduling a subsequent poll for each queue based on a comparison between the first parameter and the second parameter corresponding to each queue, wherein the subsequent poll is either a different one of the scheduled poll and the on-demand poll, or the scheduled poll having a different polling interval than the initial polling mode, wherein the initial polling mode is also the scheduled poll; and
   wherein the scheduling further comprises:
   e) determining whether the second parameter is greater than or equal to the first parameter, wherein the first parameter is a polling interval indicative of how frequently the scheduled poll is conducted and the second parameter is a weighted advance time providing a measure of an exponential moving average time it takes a call to advance one position within a corresponding queue;
   f) switching the initial polling mode to the on-demand poll if the second parameter is equal to or greater than the first parameter and the corresponding queue is in the scheduled poll mode;
   g) switching the initial polling mode to the scheduled poll if the second parameter is less than the first parameter by a second threshold and the corresponding queue is in the on-demand poll mode; and
   h) maintaining the initial polling mode if neither (f) nor (g) exists.

2. The method of claim 1, wherein the first parameter comprises at least one of an expected arrival time parameter, the first threshold, the second threshold, the third threshold, and the queue polling interval.

3. The method of claim 1, wherein the second parameter comprises at least one of the weighted advance time and the actual expected wait time.

4. A method of determining a poll, the method comprising:
   a) maintaining at least one first parameter of each queue of a plurality of queues;
   b) determining at least one second parameter of each queue on expiry of a corresponding queue polling interval;
   c) comparing a difference between the second parameter and the corresponding first parameter with a first threshold; and
   d) scheduling a subsequent poll by adjusting the queue polling interval based upon the comparison, wherein the scheduling of the subsequent poll by adjusting comprises:
   e) increasing the queue polling interval if the difference is less than the first threshold; and
   f) decreasing the queue polling interval if the difference is more than the first threshold.

5. The method of claim 4, wherein the first parameter comprises at least one of a weighted advance time, an adjusted expected wait time, a first threshold, and a queue polling interval.

6. The method of claim 4, wherein the second parameter comprises an actual expected wait time.

7. A system for dynamically determining a poll subsequent to an event, wherein the event comprises an arrival of a call or expiry of a polling interval, the system comprising:
   a) a memory maintaining at least a first parameter for each of one or more queues;
   b) a communications device that conducts a poll for each of the one or more queues based upon an initial polling mode corresponding to each of the one or more queues, wherein the initial polling mode comprises one of a scheduled poll and an on-demand poll;
   c) a determinator that determines at least a second parameter for each of the one or more queues based on the poll; and d) a scheduler that schedules a subsequent poll for each of the one or more queues based on a comparison between the first parameter and the second parameter corresponding to each of the one or more queues, wherein the subsequent poll is a different one of the scheduled poll and the on-demand poll, and wherein the scheduler further:

e) determines whether the second parameter is greater than or equal to the first parameter, wherein the first parameter is a polling interval indicative of how frequently the scheduled poll is conducted and the second parameter is a weighted advance time providing a measure of an exponential moving average time it takes a call to advance one position within a corresponding queue;

f) switches the initial polling mode to the on-demand poll if the second parameter is equal to or greater than the first parameter and the corresponding queue is in the scheduled poll mode;

g) switches the initial polling mode to the scheduled poll if the second parameter is less than the first parameter by a second threshold and the corresponding queue is in the on-demand poll mode; and h) maintains the initial polling mode if neither (f) nor (g) exists.

8. The system of claim 7, wherein the first parameter comprises at least one of an expected arrival time, a first threshold, a second threshold, and a queue polling interval.

9. The system of claim 7, wherein the second parameter comprises at least one of a weighted advance time and actual expected wait time.

10. An apparatus for performing the method of one or more of the claims 1 and 2-6.

11. A non-transitory computer readable medium containing instructions which, when executed in a computer, cause the computer to perform the method of one or more of claims 1 and 2-6.

12. A method of dynamically determining a poll subsequent to an event, wherein the event comprises an arrival of a call or expiry of a polling interval, the method comprising:

a) maintaining at least a first parameter for each of one or more queues;

b) conducting a poll for each queue based upon an initial polling mode corresponding to each of the one or more queues, wherein the initial polling mode comprises one of a scheduled poll and an on-demand poll;

c) determining at least a second parameter for each queue based on the poll;

d) scheduling a subsequent poll for each queue based on a comparison between the first parameter and the second parameter corresponding to each queue, wherein the subsequent poll is either a different one of the scheduled poll and the on-demand poll, or the scheduled poll having a different polling interval than the initial polling mode, wherein the initial polling mode is also the scheduled poll; and wherein the scheduling further comprises:

e) determining whether the second parameter is less than the first parameter, wherein the first parameter is a third threshold and the second parameter is a weighted advance time providing a measure of an exponential moving average time it takes a call to advance one position within a corresponding queue;

f) switching the initial polling mode to the scheduled poll if the second parameter is less than the first parameter and the corresponding queue is in the on-demand poll mode; and g) maintaining the initial polling mode if the second parameter is greater than or equal to the first parameter.

* * * * *